(12) United States Patent
Christl et al.

(10) Patent No.: US 10,666,836 B2
(45) Date of Patent: May 26, 2020

(54) DECENTRALLY SYNCHRONIZED MULTI-SENSOR SYSTEM

(71) Applicant: Robert Bosch GmbH, Stuttgart (DE)

(72) Inventors: Andreas Christl, Bietigheim-Bissingen (DE); Danny Uischner, Rutesheim (DE); Ibrahim Duran, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/736,424

(22) PCT Filed: Apr. 6, 2016

(86) PCT No.: PCT/EP2016/057495
§ 371 (c)(1),
(2) Date: Dec. 14, 2017

(87) PCT Pub. No.: WO2017/001069
PCT Pub. Date: Jan. 5, 2017

(65) Prior Publication Data
US 2018/0176424 A1    Jun. 21, 2018

(30) Foreign Application Priority Data
Jun. 30, 2015  (DE) ........................ 10 2015 212 218

(51) Int. Cl.
*H04N 5/04* (2006.01)
*H04N 7/18* (2006.01)
*B60R 1/00* (2006.01)

(52) U.S. Cl.
CPC ............... *H04N 5/04* (2013.01); *H04N 7/181* (2013.01); *B60R 1/00* (2013.01); *B60R 2300/00* (2013.01); *B60R 2300/105* (2013.01)

(58) Field of Classification Search
CPC .... H04N 5/04; H04N 5/125; B60R 2300/105; B60R 1/00
See application file for complete search history.

(56) References Cited

U.S. PATENT DOCUMENTS 6,791,602 B1 * 9/2004 Sasaki .................... H04N 5/268
348/159
8,505,054 B1 * 8/2013 Kirley .................. H04N 21/436
725/74

(Continued)

FOREIGN PATENT DOCUMENTS

CN    103370634 A    10/2013
CN    103702073 A    4/2014

(Continued)

OTHER PUBLICATIONS

International Search Report dated Jul. 5, 2016, of the corresponding International Application PCT/EP2016/057495 filed Apr. 6, 2016.

*Primary Examiner* — Jefferey F Harold
*Assistant Examiner* — Humam M Satti
(74) *Attorney, Agent, or Firm* — Norton Rose Fulbright US LLP; Gerard Messina

(57) ABSTRACT

A multi-sensor system, made up of at least two sensor units, in which the sensors may be activated at predefined target points in time on the basis of internal clocks mounted decentrally in the sensor units, in order to record data. Thus, the triggering of the sensor measurements and the assignment of measured data at the corresponding measuring points in time take place decentrally in the sensor units. So that all measuring points in time are based on a common time, the individual sensor units of the multi-sensor system may be synchronized with the aid of a synchronization signal.

14 Claims, 3 Drawing Sheets

(56) References Cited

U.S. PATENT DOCUMENTS

| | | | |
|---|---|---|---|
| 9,088,406 B2* | 7/2015 | Newham | H04L 7/041 |
| 2002/0186802 A1* | 12/2002 | Morgan | H03L 7/091 |
| | | | 375/355 |
| 2003/0231871 A1* | 12/2003 | Ushimaru | H04N 21/4104 |
| | | | 386/207 |
| 2006/0204038 A1 | 9/2006 | Yokota et al. | |
| 2007/0094528 A1 | 4/2007 | Fredriksson et al. | |
| 2009/0059962 A1* | 3/2009 | Schmidt | H04J 3/0667 |
| | | | 370/503 |
| 2010/0103878 A1* | 4/2010 | Fujiwara | H04L 67/12 |
| | | | 370/328 |
| 2011/0187861 A1 | 8/2011 | Totani | |
| 2012/0257045 A1* | 10/2012 | Ockerse | B60R 1/00 |
| | | | 348/135 |
| 2014/0160291 A1* | 6/2014 | Schaffner | B60R 1/00 |
| | | | 348/148 |
| 2014/0226034 A1 | 8/2014 | Sarwari et al. | |
| 2014/0333834 A1* | 11/2014 | Mellot | H04N 5/12 |
| | | | 348/500 |
| 2015/0179227 A1* | 6/2015 | Russell | H04N 21/4122 |
| | | | 386/201 |
| 2015/0295700 A1* | 10/2015 | Gomez Gutierrez | G06F 1/14 |
| | | | 375/354 |
| 2016/0021292 A1* | 1/2016 | Zhang | H04N 5/23206 |
| | | | 348/211.2 |
| 2016/0352388 A1* | 12/2016 | Lane | H04L 7/08 |

FOREIGN PATENT DOCUMENTS

| | | |
|---|---|---|
| CN | 104412585 A | 3/2015 |
| CN | 104717480 A | 6/2015 |
| DE | 102011003345 A1 | 8/2012 |
| DE | 102013202320 A1 | 8/2014 |

* cited by examiner

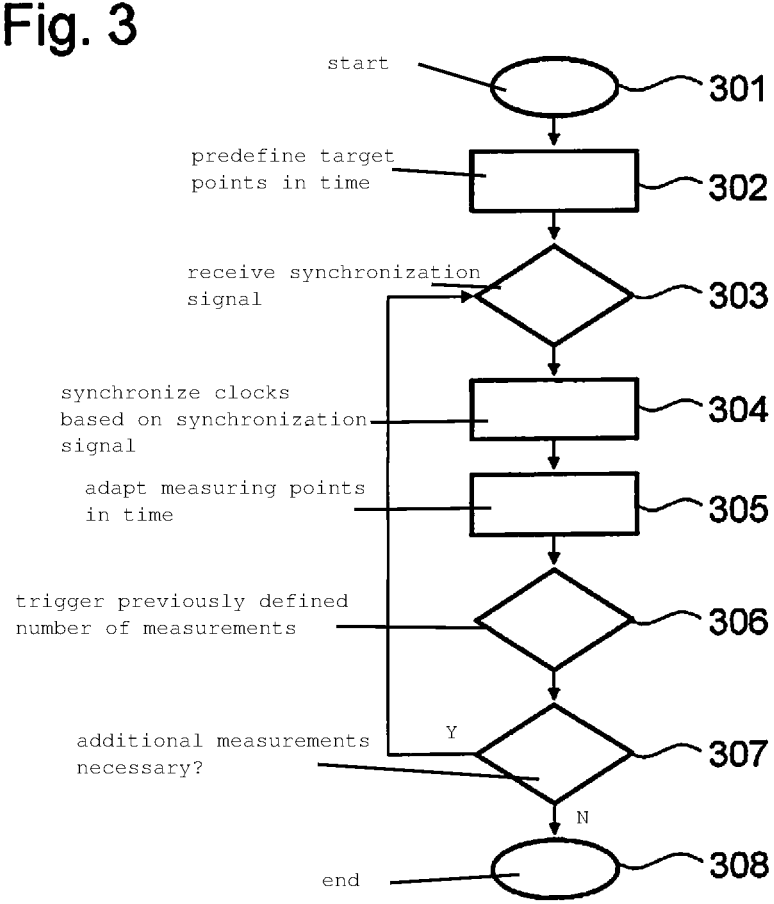

DECENTRALLY SYNCHRONIZED MULTI-SENSOR SYSTEM

FIELD

The present invention relates to a multi-sensor system for a vehicle for ascertaining various sensor data.

BACKGROUND INFORMATION

Conventional sensor systems may be made up of multiple cameras, for example, which are intended to create chronologically synchronized images. A corresponding system is described in U.S. Patent App. Pub. No. 2006/0204038, in which images are recorded by two cameras. The time information of the images in this case is provided with the aid of a central clock.

In U.S. Patent App. Pub. No. 2011/0187861, a camera system is described which records images as soon as an impact is detected via an acceleration sensor. The recorded images are provided with a piece of time information with the aid of a clock installed in the system. This time of the installed clock is automatically corrected via periodically received radio signals.

SUMMARY

A multi-sensor system according to the present invention for a vehicle is made up of at least two sensor units. The sensor units each include at least one sensor, one internal clock and one control unit. The control unit is designed to adapt measuring points in time of the at least one sensor on the basis of the time of the internal clock. It is also capable of receiving a synchronization signal and to synchronize the internal clock based on this synchronization signal.

This decentralization results in multiple advantages. For one, a central control unit, which controls the synchronization, monitors the measuring points in time of the different sensor units and, if necessary, corrects existing deviations, is no longer necessary. In addition, it is no longer necessary to transmit separate control signals over the communication lines or over the communication paths, as a result of which the data flow is lower and the transmission is less susceptible to error. The decentralized control mechanism in the sensor units also offers the advantage that already existing synchronization signals may be resorted to by additional synchronized clocks in already existing vehicle systems. Deviations of the measuring points in time of individual sensors from predefined target points in time may be adapted or corrected decentrally directly in the multi-sensor system according to the present invention. Since the correction does not have to be centrally calculated and sent, the correction is significantly faster and also more robust against signal failures.

In addition, the multi-sensor system may be easily expanded to include an arbitrary number of sensors without the need for complex hardware modifications or software modifications, since the assignment of measuring points in time to the corresponding measurements in the individual systems functions self-sufficiently. If individual sensor units are switched off, these sensor units may then independently adapt these measurements of the sensors after a re-start to predefined target points in time due to their internal clock, the target points in time corresponding to fixed times. Fixed times here do not necessarily mean that the times have to be indicated in a standard time format, for example, based on hours, minutes and seconds. The number of sensors may be dynamically changed during the operation without the need for a configuration prior to the start of operation.

Moreover, the chronological drift of internally installed clocks is generally very minimal, as a result of which the sensor units are very robust against signal failures after an initial synchronization. A chronological drift may be understood in this case to mean a deviation of the present time from the actual time, which changes over time.

In another specific embodiment of the multi-sensor system, the synchronization signal is transmitted by a synchronization source, at least one of the sensor units and/or a control unit functioning as a synchronization source. A control unit, if it is used as a synchronization source, must likewise have an internal clock.

This multi-sensor system is capable of receiving synchronization signals from different sources. Thus, the time may be synchronized either with the aid of a central control unit or one of the sensor units assumes this task and therefore serves as a sensor unit and synchronization source. Multiple synchronization sources may also be selected which, for example, initially self-synchronize and subsequently emit the tuned synchronization signal. The synchronization signal may be uni-directional or bi-directional, depending on the synchronization method used. This means that signals may be sent either in only one direction or in both directions.

Synchronization signals are understood here to mean signals that are able to convey time information. In this regard, different types of coding of the synchronization signal are possible.

For example, an empty signal may be initially transmitted by a transmitter. The receiving unit sets a time marker at the point in time of the reception of this empty signal. Another signal having a piece of time information is sent by the transmitter with a certain time delay. This may include, for example, the time at the point in time the empty signal is emitted. The receiving unit receives this signal and assigns the corresponding time to the point in time at which the time marker was set. This time may be based on the time of the transmitter of the synchronization signal, i.e., on the time of the synchronization source, the time however also having been conveyed by another unit to the synchronization source.

Synchronization signals may also include additional information such as, for example, a piece of information about the source of the signal, information about the interconnected receivers and transmitters, about the position and/or the distance of the synchronization source, about the signal delay due to the hardware used, to the distance, to the transmission path or to the type of transmission. Additional information is also conceivable.

In one advantageous specific embodiment of the multi-sensor system, this system includes an evaluation unit, with the aid of which data generated by the sensor units are processable.

In this way, the sensor information may be processed in one shared unit and the data may be evaluated in accordance with the requirements of the multi-sensor system. In addition, algorithms of driver assistance functions, which process the data of the multi-sensor system, may also be implemented in the evaluation unit.

In another specific embodiment of the multi-sensor system, the synchronization signal may also be transmitted by the evaluation unit. In this case, the evaluation unit must also include an internal clock.

This specific embodiment offers the advantage that the evaluation unit may be assigned multiple meaningful properties. In this case, it serves both as a synchronization source and as an evaluation unit for the received sensor data. Thus, the evaluation unit, due to its internal clock, is able to compare times of operations internally carried out with measuring points in time of the sensor data, it being ensured that the points in time refer to an identical time basis, i.e., to a previously synchronized time.

In another specific embodiment of the multi-sensor system, all sensor units of the multi-sensor system are synchronizable with the aid of the same synchronization signal.

This means that technically the possibility must exist that all sensor units are able to receive the information from the synchronization signal. The transmission of the synchronization signal in this case need not take place along the same path and in identical form. For example, a conversion of the signal by an interconnected receiver and transmitter may have taken place. If, for example, the synchronization signal is emitted by the synchronization source via radio, it may be forwarded via an intermediate station also via a cable line to an additional sensor unit.

In another specific embodiment of the multi-sensor system, all sensor units of the multi-sensor system directly receive the synchronization signal of a shared synchronization source.

In this specific embodiment, the multi-sensor system is configured in such a way that all sensor units may directly receive the synchronization signal, as a result of which a direct connection with the synchronization source must exist. This has the advantage that the synchronization source is able to transmit an individual synchronization signal to each sensor unit. If, for example, the synchronization signal includes information only about the time of the synchronization source and the transmission times to the individual sensor units differ, asynchronicities may then occur. If it is known that the transmission times to the individual sensor elements differ, the synchronization source may then adapt the time information in the synchronization signal individually to each sensor unit prior to transmitting.

In this way, the function volume of the control units in the sensor units may be kept low, with the result in turn that costs for manufacturing the sensor units may be saved.

In another specific embodiment of the multi-sensor system, measurements of the at least one sensor at a predefined measuring frequency are triggerable at measuring points in time, the measuring points in time being adaptable to predefined target points in time with the aid of the time of the internal clock.

In this specific embodiment, measurements are triggered at a predefined measuring frequency. For this purpose, the sensor units may include a clock generator, for example, which is implemented either in the control unit or as an additional component in the sensor unit. Corresponding measuring points in time result from the starting point in time and the measuring frequency. These measuring points in time do not necessarily have to coincide with the predefined target points in time, which may be arbitrarily selected. The multi-sensor system or the individual sensor units in this case are configured in such a way, however, that the measuring points in time may be adapted to predefined target points in time with the aid of the internal clock. Without an internal clock, the adaptation would be possible only with the aid of a signal transmitted by an external source.

In one preferred specific embodiment of the multi-sensor system, at least one sensor unit includes an imaging sensor.

The use of an imaging sensor in a sensor unit of the multi-sensor system enables the imaging sensor to record images and to provide them with a piece of time information. If multiple imaging sensors are used, the measured data of the sensors may be processed together and, with the additional time information, additional information may be obtained from the measured data. Thus, images recorded virtually simultaneously by sensors having different fields of view may be assembled in order to produce a panorama image or a 360° view of the surroundings of the vehicle. With precise knowledge of the recording points in time, it is possible, for example, to correctly interpret overlapping areas of multiple imaging sensors and to thereby carry out exact linkings of the images.

According to the present invention, a method for a multi-sensor system for a vehicle is also introduced, which is made up of at least two sensor units. The sensor units each include at least one sensor, one internal clock and one control unit. The control unit is designed to adapt measuring points in time of the at least one sensor to predefined target points in time on the basis of the time of the internal clock, and to receive a synchronization signal, and—based on this synchronization signal—to synchronize the internal clock.

An example method according to the present invention includes the following steps:
receiving the synchronization signal with the aid of the control unit.
synchronizing the internal clock with the aid of the control unit on the basis of the information contained in the synchronization signal.
adapting the measuring points in time of the at least one sensor to the predefined target points in time with the aid of the control unit on the basis of the time of the internal clock.

This method may be applied to all sensor units of the multi-sensor system. In such case, the synchronization may take place simultaneously or time-delayed, which is made possible by the fact that the individual sensor units are able to carry out measurements at predefined target points in time without a central control due to their decentralized internal clocks. The predefined target points in time may be either statically established or dynamically determined during operational startup. The predefined target points in time in this case are already stored in the control units during operational startup or are established immediately after the start.

The method introduced here offers the advantage that an adaptation of the measuring points in time at predefined target points in time may be performed self-sufficiently in the sensor units on the basis of the predefined target points in time and on the basis of the time of the internal clocks of the sensor units. In this way, the sensor units of the multi-sensor system may be operated without a regular central control signal, which receives information about predefined target points in time or ensures a triggering of the measurement, an exact synchronization of the measuring points in time of the various sensor units being ensurable. Another advantage of this method is that the predefined target points in time are not subject to limitations. The predefined target points in time may have regular intervals, which corresponds to a measurement at a particular measuring frequency, they may, however, be completely irregularly selected. In addition, the points in time are arbitrarily selectable. They may be either in the near future or in the distant future. Thus, points in time may be determined within the next nanoseconds and points in time may be determined in multiple years. If the clocks of the various sensor units run synchronously at the corresponding predefined target points in time, then a recording synchronization of the different sensors of the multi-sensor system may be ensured for years on the basis of the predefined target points in time once established.

New sensor units, if they are added to the present multi-sensor system, need only be communicated the same predefined target points in time. After a one-time synchronization of the internal clocks and after the adaptation of the measuring points in time to the predefined target points in time, all measurements are carried out at the same measuring points in time.

In another specific embodiment of the method, the measuring points in time are adapted to the predefined target points in time by a triggering of the measurements of the at least one sensor via the control unit. The control unit in this case triggers each measurement of the at least one sensor with the aid of the time of the internal clock at a particular measuring point in time, the measuring points in time being set to the predefined target points in time.

The advantage of this method is that the measurements are triggered directly at the predefined target points in time. The adaptation in this case takes place by setting the measuring points in time directly to the predefined target points in time with the aid of the time of the internal clock. Thus, once the target points in time are specified, the measurements take place invariably only at the correct point in time, as long as the internal clock runs synchronously with the additional internal clocks of the other sensor units.

This method also offers the advantage that a clock generator, which triggers the measurements at a particular frequency, is not required. This may ensure that all sensor data are recorded exactly at the predefined target points in time. With the aid of the clock synchronization, it is theoretically possible to reduce the chronological deviations of the measurements in the entire multi-sensor system to the nanosecond range.

In another specific embodiment of the method, the measurements are triggered at a predefined measuring frequency. The measuring points in time are adapted to the predefined target points in time with the aid of the time of the internal clock.

The advantage of this method is that not every measurement must be individually triggered with the aid of a predefined target point in time, as a result of which chronological limitations or restrictions could occur. The measurements in this method are carried out at a particular measuring frequency, which is predefined, for example, by a clock generator, for example a quartz crystal installed in the control unit or installed separately. Only the frequencies and/or starting points in time of the measurements are monitored with the aid of the control unit and modified, if necessary, so that the measuring points in time may be adapted to the predefined target points in time.

In another specific embodiment of the method, in which the measurements are triggered at a predefined measuring frequency, the measuring points in time are adapted to the predefined target points in time by a change of the measuring frequency.

This specific embodiment of the method offers the advantage that in the case of a measurement carried out at one measuring frequency, only one parameter, the frequency, must be changed in order to adapt the measuring points in time to the given target points in time. The change of the measuring frequency in this case may affect one measurement and/or multiple measurements and/or all subsequent measurements. It is also conceivable that the measuring frequency is newly adapted after each measurement.

In another embodiment of the method, in which the measurements are triggered at a predefined measuring frequency, the measuring points in time are adapted to the predefined target points in time by a chronological delay or a chronological advance of at least one measuring point in time.

This method offers the advantage that the measuring points in time determined by the measuring frequency and by the starting point in time of the measurements may be very easily adapted to the predefined target points in time, if the measuring points in time and the predefined target points in time include merely one phase shift, i.e., if the measuring points in time are delayed by a certain period of time in relation to the target points in time. If, as a result of the measuring frequency, the chronological intervals of the measurements correspond exactly to the chronological intervals of the predefined target points in time, then a single adaptation of one measuring point in time to one predefined target point in time is sufficient, if it is assumed that this new measuring point in time functions as starting points for the additional measurements with the aid of the measuring frequency.

Since deviations normally prevail between the intervals of the predefined target points in time and the intervals of the measuring points in time determined with the aid of a measuring frequency, since, for example, the frequency exhibits slight fluctuations or does not correspond exactly to the inverse of the intervals of the predefined target points in time, then the adaptation of the measuring points in time to the predefined target points in time must be periodically repeated. If the internal clock of the sensor unit is synchronized once, the adaptation may then be performed in the sensor unit with the aid of the control unit at arbitrary times.

The method also allows for a combination of the two aforementioned adaptation methods. This means, the measuring points in time may be adapted to the predefined target points in time both by adapting the measuring frequency as well as by chronologically delaying or chronologically advancing at least one measuring point. This combination offers the advantage that it may be situationally appropriately decided which adaptation is more expedient at the instantaneous point in time. If, for example, the chronological intervals of the measuring points in time coincide with the chronological intervals of the predefined measuring points in time and are merely somewhat time-delayed, the adaptation of one measuring point in time could then be advanced at this point relative to an adaptation of the measuring frequency, since the measuring frequency is already finely tuned to the predefined target points in time. If, on the other hand, the intervals do not coincide exactly and diverge further with each measurement, then the measuring frequency could be correspondingly adapted in place of a periodic chronological delaying or chronological advancing of the measuring points in time. In addition a measuring point may, for example, be chronologically advanced or chronologically delayed one time to ensure that the measuring points in time are at the predefined target points in time once the correct frequency is set.

Additional details, features and feature combinations, advantages and effects on the basis of the present invention result from the description below of preferred exemplary embodiments of the present invention and from the figures.

BRIEF DESCRIPTION OF THE DRAWINGS

FIG. 3 shows an alternative exemplary method sequence.

DETAILED DESCRIPTION OF EXAMPLE EMBODIMENTS

Figure 1:
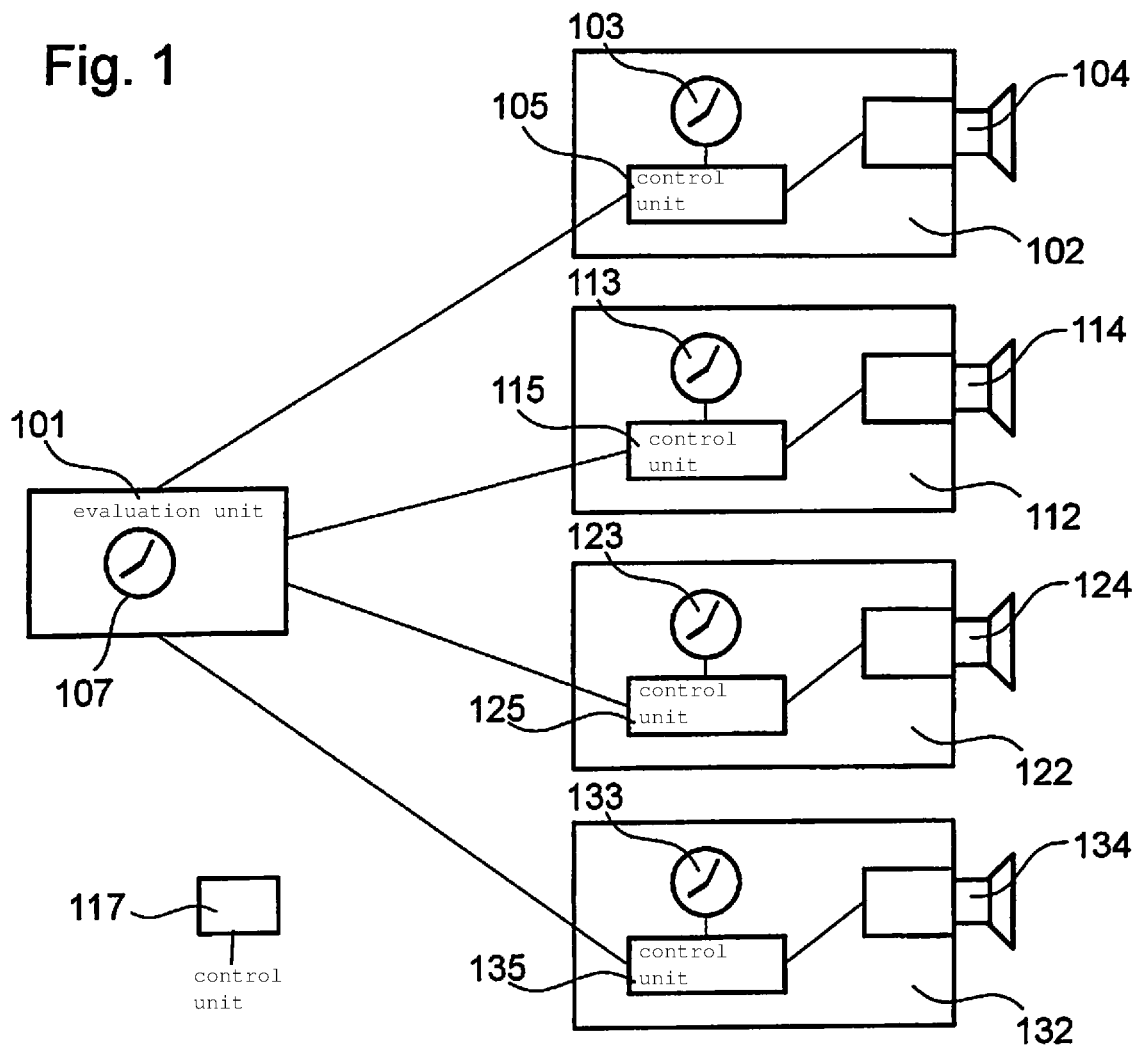
FIG. 1 shows an exemplary multi-sensor system having four cameras.

FIG. 1 shows an exemplary embodiment of the multi-sensor system according to the present invention. The multi-sensor system is made up of four sensor units 102, 112, 122, 132 and one evaluation unit 101. Sensor units 102, 112, 122, 132 each include a sensor 104, 114, 124, 134, which is implemented in the exemplary embodiment by an imaging sensor. Arbitrary sensors used in the automobile sector may alternatively also be used as sensors such as, for example, radar sensors, all types of cameras, acceleration sensors, rotation rate sensors, pressure sensors, structure-borne sound sensors, ultrasonic sensors, LIDAR sensors, lasers, moisture sensors, gyro-sensors, GPS sensors, temperature sensors, CO2 sensors, lambda sensors, compasses, geo-magnetic sensors and E-compasses, this list not to be considered as exhaustive.

In addition, sensor units 102, 112, 122, 132 each include a control unit 105, 115, 125, 135 and an internal clock 103, 113, 123, 133. Evaluation unit 101 also includes an internal clock 107. Evaluation unit 101 is directly connected to sensor units 102, 112, 122, 132 of the multi-sensor unit. The connection may be formed with cables or wirelessly. This includes all prevalent methods of transmission such as transmissions via electromagnetic waves.

The system is intended to be able to generate an all-around view of the vehicle with the aid of imaging sensors 104, 114, 124, 134. Sensor units 102, 112, 122, 132 are therefore mounted on and/or in the vehicle in such a way that they include the fields of view necessary for an all-around view and that they detect the necessary areas. In addition, two adjoining sensors each 104, 114, 124, 134 have overlapping image areas, so that the image transitions of the recorded images optimally reflect the scene present at the point in time of the recording.

For generating a high quality all-around view, the exemplary multi-sensor system is capable of recording the four required images for the all-around view within a period of 500 μs. For this purpose, it must be ensured that the measuring points in time of the different sensors 104, 114, 124, 134 are very precisely matched to one another.

In the exemplary embodiment, a decentralized synchronization mechanism is used for this purpose, which requires neither trigger lines nor a central control unit.

The synchronization mechanism is made up of two partial mechanisms separated from one another. The fundamental idea of the mechanism is that all sensors 104, 114, 124, 134 record images at permanently predefined target points in time. Each sensor unit 102, 112, 122, 132 controls its sensor 104, 114, 124, 134 independently and completely decentrally in such a way that the image recordings coincide with these predefined target points in time. In order to ensure this, the internal clocks 103, 113, 123, 133 of sensor units 102, 112, 122, 132 are synchronized with the aid of a standardized mechanism.

To ensure that all images are recorded in the desired time window of 500 μs, a method is introduced at this point by way of example, which may be used in the exemplary multi-sensor system. The method starts initially in step 201.

In next step 202, individual sensor units 102, 112, 122, 132 are specified predefined target points in time. The predefined target points in time may by specified by storing the predefined target points in time in a memory of sensor units 102, 112, 122, 132. The predefined target points in time may be stored, in particular, in the memory of control units 105, 115, 125, 135. In such case, the specification may take place in the factory, i.e., during production, in sensor units 102, 112, 122, 132 and/or in their control units 105, 115, 125, 135. Sensor units 102, 112, 122, 132 may also be programmed in the finished state. A programming in the installed state in the vehicle, for example, with the aid of evaluation unit 101 and/or a control unit 117 is equally conceivable. If the images are to be recorded at a predefined target frequency, as is the case in this exemplary embodiment, the predefined target points in time may then be derived, for example, from the predefined target frequency.

The set of predefined target points in time T could, for example, be defined as follows:

$$T=\{t:t=n*1/\text{target frequency [Hz]} \in n \in N\}$$

The predefined target points in time then result with the aid of the target frequency and a starting point, which is set here at 0:00:00, for example.

For technical reasons, it may happen that the actual measuring frequency does not correspond exactly to the predefined target frequency. This results in deviations from the predefined target points in time during a periodic triggering of the measurements, even if the measurement is started simultaneously at one of the predefined target points in time.

The measurements are assigned target points in time, even when the actual measuring points in time deviate from the predefined target points in time. The predefined point in time that exhibits the smallest chronological interval in relation to the actual measuring point in time of the measurement is selected from the set of all predefined target points in time as the target point in time of a measurement.

Internal clocks 103, 113, 123, 133 of sensor units 102, 112, 122, 132 are used to correct the occurring deviation. Since each sensor unit 102, 112, 122, 132 and also evaluation unit 101 includes a separate internal clock 103, 113, 123, 133, 107, on the basis of which calculations are carried out or recording points in time are interpreted and/or assigned, these clocks 103, 113, 123, 133, 107 must initially be synchronized. In this way, asynchronicities between the individual components of the multi-sensor system are avoided.

In the exemplary embodiment, all clocks 103, 113, 123, 133, 107 are synchronized on the basis of clock 107 of evaluation unit 101, which accordingly transmits synchronization signals to all sensor units 102, 112, 122, 132. Alternatively, the synchronization signal may also come from an arbitrary control unit 117 in the vehicle or may be transmitted by an external source, for example, via radio. The synchronization may also take place via radio waves or GPS signals.

In step 203, sensor units 102, 112, 122, 132 receive the synchronization signal of evaluation unit 101. The synchronization signal in this case is received with the aid of control units 105, 115, 125, 135 of sensor units 102, 112, 122, 132.

In step 204, all internal clocks 103, 113, 123, 133 are adapted to the corresponding time of clock 107 on the basis of the time information in the synchronization signal, as a result of which all clocks 103, 113, 123, 133, 107 of the multi-sensor system are synchronized. The adaptation may be carried out with the aid of control units 105, 115, 125, 135, which are coupled to internal clocks 103, 113, 123, 133.

Various transmission protocols may be used for the synchronization of the multi-sensor system. This includes standardized protocols such as, for example, NTP (Network Time Protocol) or PTP (Precision Time Protocol) or similar types of protocols. In this exemplary embodiment, clock 107 of evaluation unit 101 represents the main clock, also called grandmaster clock.

In alternative specific embodiments, however, it is possible to also use all other clocks 103, 113, 123, 133 present in the multi-sensor system or an additional clock as a grandmaster clock. It must only be ensured that a corresponding synchronization signal having the necessary information for synchronization with this additional clock may be received by individual sensor units 102, 112, 122, 132 and, if necessary, by evaluation unit 101 of the multi-sensor system.

Regardless of which synchronization source is used, individual sensor units 102, 112, 122, 132 start their measurements in step 205 after the synchronization of the multi-sensor system is carried out.

In order for the measuring points in time to be preferably close to the predefined target points in time, it is checked in step 206 whether the instantaneous measuring point in time coincides with the predefined target point in time. This synchronization need not necessarily be carried out with each measurement, but may take place only after a previously defined number of measurements. Adaptation intervals may also be defined or predefined by control units 105, 115, 125, 135.

If the check concludes that the measuring point in time is sufficiently close to the predefined target point in time, the maximum deviation also capable of being situationally appropriately defined and/or adapted to the multi-sensor system, then the method skips to step 210 and carries out the next measurement or, if necessary, multiple additional measurements.

The data generated by the sensors are transmitted to evaluation unit 101 either directly after the measurement or with a certain time delay.

In step 211, it is subsequently checked whether additional sensor data are required. For example, whether a further all-around view should be created or whether there is presently no need for additional sensor data. If additional measuring is required, the method then skips, if necessary, back to step 206, in which it is checked again whether the instantaneous measuring point in time is sufficiently close to the predefined target point in time. After how many measurements the check of the coincidence of the measuring points with the predefined target points in time takes place again may, as previously described, vary or, if necessary, may take place only once.

If no further measurements are required, for example, if the vehicle is switched off, the method then ends in step 212.

If, on the other hand, it is established in step 206 that the measuring point in time deviates too far from the predetermined target point in time, an analysis of the problem as to why a deviation of the measuring point in time from the predetermined target point in time is present takes place in step 207. For this purpose, either only the instantaneous time delay of the measurements may be considered or multiple variables may be included in the analysis, such as the deviations of the previous measuring points in time from the predefined target points in time and/or the deviation of the measuring frequency from the target frequency.

Depending on the result of the analysis in step 207, two methods may be applied for adapting the subsequent measuring points in time to the predefined target points in time. If it is established in step 207 that the measuring frequency deviates from the target frequency, the measuring frequency may be increased or reduced accordingly in step 208. Even if the exact target frequency may never be adjusted, for example, due to the hardware used, the deviation may be minimized via a periodic adaptation of the frequency.

If it is established in step 207 that the measuring frequency is very close to the target frequency, but that a smaller, potentially periodic, time delay between the measuring points in time and the predefined target point in time has occurred, this may also be compensated for in step 208 via an adaptation of the measuring frequency. For example, the frequency may be adjusted in such a way that the two subsequent measurements may be carried out at a higher frequency and, the original measuring frequency close to the target frequency may subsequently be reset. As a result, a chronological advance of the measuring points in time would be implemented, for example. Accordingly, to achieve a chronological delay of the measuring points in time, the measuring frequency could be temporarily reduced.

Alternatively, in the case of strongly coinciding measuring frequencies and target frequencies and a time delay present between measuring points in time and predefined target points in time, the next measuring point in time could simply be chronologically advanced or chronologically delayed in step 209 without temporarily adapting the frequency.

It is also possible to combine both methods 208, 209 and to shift individual measuring points in time as well as to carry out an adaptation of the measuring frequency. Which methods should be most expediently applied may be decided as a function of the outcome of the analysis in step 207.

Once the measuring points in time are successfully adapted to the predefined target points in time, the method continues with step 210, in which, as previously described, one or multiple measurements are carried out at the adapted measuring points in time.

Figure 2:
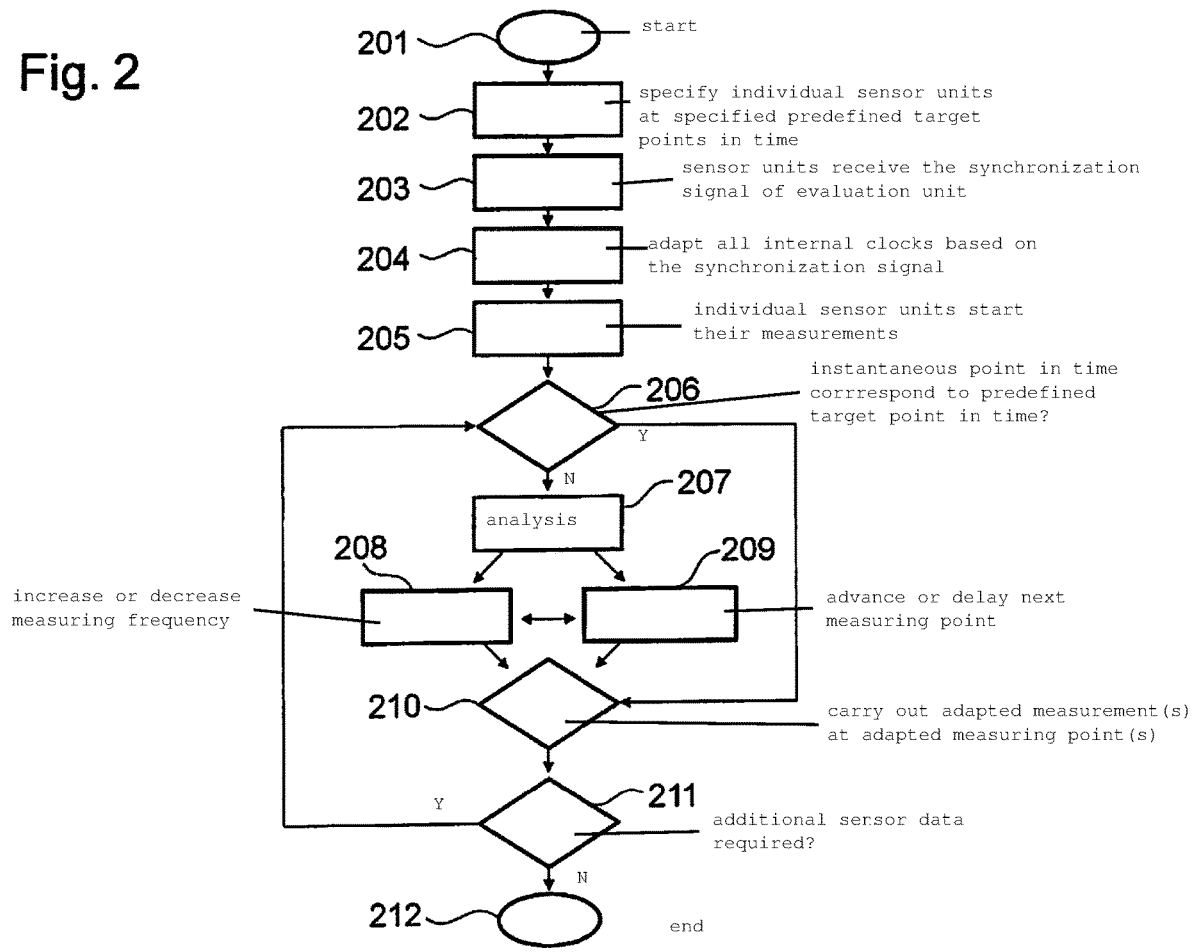
FIG. 2 shows an exemplary method sequence.

A simplified method for synchronized recording of sensor data in a multi-sensor system is described in FIG. 3 by way of example. The method resembles in its main features the previously introduced method from FIG. 2. The method starts with step 301. In step 302, target points in time are predefined, similar to step 202. These may be arbitrarily selected and need not exhibit any regularities.

In step 303, the synchronization signal is received by sensor units 102, 112, 122, 132, similar to step 203, and all clocks 103, 113, 123, 133, 107 are synchronized in step 304 on the basis of the time information of the synchronization signal.

The measuring points in time are adapted to the predefined target points in time in step 305. In this method example, the adaption takes place in that the measuring points in time are set to the predetermined target points in time with the aid of synchronized internal clocks 103, 113, 123, 133. This means that control units 105, 115, 125, 135 trigger each individual measurement of sensors 104, 114, 124, 134.

In step 306, a previously defined number of measurements is triggered by control units 105, 115, 125, 135 and the corresponding measured values are transmitted to evaluation unit 101.

In step 307, it is decided whether additional measurements are necessary or required by the multi-sensor system or by one of the components of the multi-sensor system. If this is not the case, the method then ends in step 308.

If, after a previously determined number of measurements or after a predefined time, additional measurements are to be carried out, this method may then skip in step 307 back to step 303, in which a synchronized signal is again received. In this way, individual sensor units 102, 112, 122, 132 are re-synchronized, as a result of which the measurements of various sensors 104, 114, 124, 134 of the multi-sensor system may be positioned in the predefined time window and a corresponding exact synchronization of the images is possible.

The resynchronization of clocks 103, 113, 123, 133 may also be carried out at arbitrary times or virtually continuously with the aid of a continuous synchronization signal. Even in the method from FIG. 2, a periodic synchronization is possible, which may take place either by a number of measurements and/or in periodic chronological intervals and/or at arbitrary points in time. These points in time may vary depending on the synchronization source.

What is claimed is:

1. A multi-sensor system for a vehicle, comprising:
   at least two sensor units, each of the sensor units including a sensor, an internal clock, and a control unit configured to:
     set a time of the internal clock based on a received synchronization signal; and
     subsequent to the setting of the time based on the received synchronization signal, performing the following without receiving any other external signal that includes information about any other of the at least two sensor units for synchronizing the respective sensor unit with any other of the at least two sensor units:
       control the sensor to perform a sensing function at each of a plurality of actual measuring points in time that are initially obtained at an initial clock frequency beginning from the set time of the internal clock;
       compare each of at least one of the actual measuring points in time to a corresponding fixed target point in time that is predefined for the respective sensor unit and that is indicated in the respective sensor unit at a start-up of the respective sensor unit; and
       based on a deviation of the compared actual measuring point in time from the corresponding predefined fixed point in time determined by the comparison, modify at least one following actual measuring point in time at which the control unit controls the sensor to perform the sensing function.

2. The multi-sensor system as recited in claim 1, wherein the synchronization signal is transmitted by a synchronization source, wherein the synchronization source is at least one of: (i) at least one of the sensor units, and (ii) a control unit including an internal clock.

3. The multi-sensor system as recited in claim 1, wherein the multi-sensor system includes an evaluation unit, with the aid of which data generated by the sensor units are processed.

4. The multi-sensor system as recited in claim 3, wherein the synchronization signal is transmitted by the evaluation unit, the evaluation unit including an internal clock.

5. The multi-sensor system as recited in claim 1, wherein all sensor units of the multi-sensor system are synchronizable with the aid of the same synchronization signal.

6. The multi-sensor system as recited in claim 1, wherein all sensor units of the multi-sensor system directly receive the synchronization signal of a shared synchronization source.

7. The multi-sensor system as recited in claim 1, wherein the sensor of at least one of the sensor units is an imaging sensor.

8. The method as recited in claim 7, further comprising:
   analyzing the deviation; and
   based on a result of the analysis selecting between whether the modifying is to be performed by changing the frequency at which to obtain actual measuring points in time or by advancing or delaying a next actual measuring point in time without changing the frequency, wherein the modifying is performed based on a result of the selecting.

9. The method as recited in claim 7, wherein the corresponding fixed target point in time is one of a plurality of fixed target points in time that are predefined for the respective sensor unit and indicated in the respective sensor unit at a start-up of the respective sensor unit and the method further comprises, for the each of the at least one of the actual measuring points in time, selecting whichever of the plurality of fixed target points in time is closest in time to the respective actual measuring point in time as the corresponding fixed target point in time to which to compare the respective actual measuring point in time.

10. The method as recited in claim 9, wherein the plurality of fixed target points in time are indicated in the respective sensor unit prior to occurrence of any of the plurality of actual measuring points in time.

11. The method as recited in claim 10, wherein the at least one of the actual measuring points in time is a plurality of the actual measuring points in time.

12. A method for a multi-sensor system for a vehicle that includes at least two sensor units, the sensor units each including a sensor, an internal clock, and a control unit, the method being performed by the control unit of one of the at least two sensor units and comprising:
   receiving a synchronization signal;
   setting a time of the internal clock of the respective sensor unit based on the received synchronization signal; and
   subsequent to the setting of the time based on the received synchronization signal, performing the following without receiving any other external signal that includes information about any other of the at least two sensor units for synchronizing the respective sensor unit with any other of the at least two sensor units:
     controlling the sensor of the respective sensor unit to perform a sensing function at each of a plurality of actual measuring points in time that are initially obtained at an initial clock frequency beginning from the set time of the internal clock of the respective sensor unit;
     comparing each of at least one of the actual measuring points in time to a corresponding fixed target point in time that is predefined for the respective sensor unit and that is indicated in the respective sensor unit at a start-up of the respective sensor unit;
     based on a deviation of the compared actual measuring point in time from the corresponding predefined fixed point in time determined by the comparison, modifying at least one following actual measuring point in time; and
     controlling the sensor of the respective sensor unit to perform the sensing function at the modified at least one following actual measuring point in time.

13. The method as recited in claim 12, wherein the modifying of the at least one following actual measuring point in time is performed by changing the frequency at which to obtain actual measuring points in time.

14. The method as recited in claim 12, wherein the modifying of the at least one following actual measuring point in time is performed by chronologically delaying or advancing the at least one following actual measuring point in time.

\* \* \* \* \*